(12) United States Patent
Agirman

(10) Patent No.: US 12,355,339 B2
(45) Date of Patent: Jul. 8, 2025

(54) HYBRID POWER SYSTEM FOR TRANSPORT REFRIGERATION SYSTEMS

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/347,976

(22) Filed: Jul. 6, 2023

(65) Prior Publication Data

US 2024/0022160 A1   Jan. 18, 2024

Related U.S. Application Data

(60) Provisional application No. 63/390,028, filed on Jul. 18, 2022.

(51) Int. Cl.
*H02M 1/00* (2007.01)
*H02M 3/335* (2006.01)
*H02M 7/5387* (2007.01)

(52) U.S. Cl.
CPC ..... *H02M 1/0077* (2021.05); *H02M 3/33576* (2013.01); *H02M 7/53871* (2013.01)

(58) Field of Classification Search
CPC ........................ B60H 1/00428; B60H 1/3222; B60H 1/3232; B60L 1/00; B60L 50/70;
(Continued)

(56) References Cited

U.S. PATENT DOCUMENTS

| 4,979,967 A | 12/1990 | Walter et al. |
| 5,761,908 A | 6/1998 | Oas et al. |

(Continued)

FOREIGN PATENT DOCUMENTS

| KR | 20160134962 A | 11/2016 |
| KR | 20190018181 A | 2/2019 |

(Continued)

OTHER PUBLICATIONS

European Search Report for Application No. 21163165.0, Issued Feb. 15, 2024, 6 Pages.
(Continued)

*Primary Examiner* — Elim Ortiz
(74) *Attorney, Agent, or Firm* — CANTOR COLBURN LLP

(57) ABSTRACT

A transport refrigeration system includes a compressor, condenser and evaporator; an inverter providing a multi-phase, AC output voltage to the compressor; and a DC power system having an output coupled to the inverter, the DC power system including: a primary power source; a DC-AC converter connected to the primary power source; a transformer connected to the DC-AC converter; an AC-DC converter connected to the transformer, the AC-DC converter outputting a primary DC voltage; a secondary power source; and a DC-DC converter connected to the secondary power source, the DC-DC converter outputting a secondary DC voltage; a combination of the primary DC voltage and the secondary DC voltage provides the output of the DC power system.

10 Claims, 3 Drawing Sheets

(58) Field of Classification Search
CPC .. F25B 27/00; F25B 49/025; F25B 2600/021; F25B 2700/21154; H02J 7/0063; H02J 7/007; H02J 7/00; H02M 1/0077; H02M 3/01; H02M 3/1586; H02M 3/33573; H02M 3/33576; H02M 7/53871; H02M 1/0054
USPC ......... 320/134, 107; 307/9.1, 10.1; 363/132, 363/98, 16, 21.12, 17, 131, 97, 20, 21.01, 363/37
See application file for complete search history.

(56) References Cited

U.S. PATENT DOCUMENTS

| | | | | |
|---|---|---|---|---|
| 5,886,884 | A | * | 3/1999 | Baek ................. H02M 3/33573 363/48 |
| 2009/0302818 | A1 | * | 12/2009 | Okamura ............ H02M 3/1588 323/284 |
| 2011/0084645 | A1 | * | 4/2011 | Seo .......................... H02J 3/32 320/101 |
| 2018/0055033 | A1 | | 3/2018 | Nagata |
| 2020/0086744 | A1 | | 3/2020 | Schumacher et al. |
| 2020/0130473 | A1 | | 4/2020 | Schumacher et al. |
| 2020/0207184 | A1 | | 7/2020 | Schumacher et al. |
| 2021/0070141 | A1 | * | 3/2021 | Schumacher ........... H02J 1/106 |
| 2021/0129686 | A1 | * | 5/2021 | Hao .................. H02M 7/53871 |
| 2021/0213797 | A1 | | 7/2021 | Saroka et al. |
| 2021/0252947 | A1 | | 8/2021 | She et al. |

FOREIGN PATENT DOCUMENTS

| | | |
|---|---|---|
| WO | 2016004399 A1 | 1/2016 |
| WO | 2016013469 A1 | 1/2016 |

OTHER PUBLICATIONS

European Search Report for Application No. 23185943.0, Issued Feb. 16, 2024, 9 Pages.

* cited by examiner

HYBRID POWER SYSTEM FOR TRANSPORT REFRIGERATION SYSTEMS

CROSS-REFERENCE TO RELATED APPLICATIONS

This application claims priority to U.S. Provisional Application No. 63/390,028 filed Jul. 18, 2022, all of which are incorporated herein by reference in their entirety.

BACKGROUND

Exemplary embodiments of this disclosure pertain to the art of transport refrigeration systems, and more specifically, to hybrid power systems for transport refrigeration systems.

Transport refrigeration systems may use multiple power sources, such as AC main power, fuel powered generators, batteries, etc. While existing power systems are well suited for their intended purposes, improvements in efficiency and/or size would be beneficial.

BRIEF DESCRIPTION

According to an embodiment, a transport refrigeration system includes a compressor, condenser and evaporator; an inverter providing a multiphase, AC output voltage to the compressor; and a DC power system having an output coupled to the inverter, the DC power system including: a primary power source; a DC-AC converter connected to the primary power source; a transformer connected to the DC-AC converter; an AC-DC converter connected to the transformer, the AC-DC converter outputting a primary DC voltage; a secondary power source; and a DC-DC converter connected to the secondary power source, the DC-DC converter outputting a secondary DC voltage; a combination of the primary DC voltage and the secondary DC voltage provides the output of the DC power system.

In addition to one or more of the features described herein, or as an alternative, further embodiments may include wherein the primary power source includes a fuel cell.

In addition to one or more of the features described herein, or as an alternative, further embodiments may include wherein the primary power source includes a battery.

In addition to one or more of the features described herein, or as an alternative, further embodiments may include wherein the secondary power source includes a battery.

In addition to one or more of the features described herein, or as an alternative, further embodiments may include wherein the DC-DC converter is connected in electrical series with the AC-DC converter.

In addition to one or more of the features described herein, or as an alternative, further embodiments may include wherein the DC-DC converter is connected in electrical parallel with the AC-DC converter.

In addition to one or more of the features described herein, or as an alternative, further embodiments may include a controller coupled to the DC-DC converter.

In addition to one or more of the features described herein, or as an alternative, further embodiments may include a sensor in communication with the controller, the sensor configured to detect the primary DC voltage.

In addition to one or more of the features described herein, or as an alternative, further embodiments may include wherein the controller is configured to compare the primary DC voltage to a reference.

In addition to one or more of the features described herein, or as an alternative, further embodiments may include wherein the controller is configured to make the secondary DC voltage positive when the primary DC voltage is less than the reference.

In addition to one or more of the features described herein, or as an alternative, further embodiments may include wherein the controller is configured to make the secondary DC voltage negative when the primary DC voltage is greater than the reference.

In addition to one or more of the features described herein, or as an alternative, further embodiments may include wherein the DC-AC converter includes SiC switches, the AC-DC converter includes GaN switches and the DC-DC converter includes GaN switches.

In addition to one or more of the features described herein, or as an alternative, further embodiments may include wherein the DC-AC converter includes SiC switches, the AC-DC converter includes GaN switches and the DC-DC converter includes SiC switches.

In addition to one or more of the features described herein, or as an alternative, further embodiments may include wherein the transformer is a high switching frequency transformer with zero voltage switching.

According to another embodiment, a transport refrigeration system includes a compressor, condenser and evaporator; an inverter providing a multiphase, AC output voltage to the compressor; and a DC power system having an output coupled to the inverter, the DC power system including: a primary power source; a DC-AC converter connected to the primary power source; a transformer connected to the DC-AC converter; an AC-DC converter connected to the transformer, the AC-DC converter outputting a primary DC voltage; a secondary power source; and a DC-DC converter connected to the secondary power source, the DC-DC converter outputting a secondary DC voltage; wherein a combination of the primary DC voltage and the secondary DC voltage provides the output of the DC power system; wherein the primary power source includes a fuel cell; wherein the DC-DC converter is connected in electrical series with the AC-DC converter.

In addition to one or more of the features described herein, or as an alternative, further embodiments may include a controller coupled to the DC-DC converter; wherein the controller is configured to make the secondary DC voltage positive when the primary DC voltage is less than a reference.

In addition to one or more of the features described herein, or as an alternative, further embodiments may include wherein the controller is configured to make the secondary DC voltage negative when the primary DC voltage is greater than the reference.

According to another embodiment, a transport refrigeration system includes a compressor, condenser and evaporator; an inverter providing a multiphase, AC output voltage to the compressor; and a DC power system having an output coupled to the inverter, the DC power system including: a primary power source; a DC-AC converter connected to the primary power source; a transformer connected to the DC-AC converter; an AC-DC converter connected to the transformer, the AC-DC converter outputting a primary DC voltage; a secondary power source; and a DC-DC converter connected to the secondary power source, the DC-DC converter outputting a secondary DC voltage; wherein a combination of the primary DC voltage and the secondary DC voltage provides the output of the DC power system; wherein the primary power source includes a fuel cell;

wherein the DC-DC converter is connected in electrical parallel with the AC-DC converter.

In addition to one or more of the features described herein, or as an alternative, further embodiments may include a controller coupled to the DC-DC converter; wherein the controller is configured to make the secondary DC voltage positive when the primary DC voltage is less than a reference.

In addition to one or more of the features described herein, or as an alternative, further embodiments may include wherein the controller is configured to make the secondary DC voltage negative when the primary DC voltage is greater than the reference.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
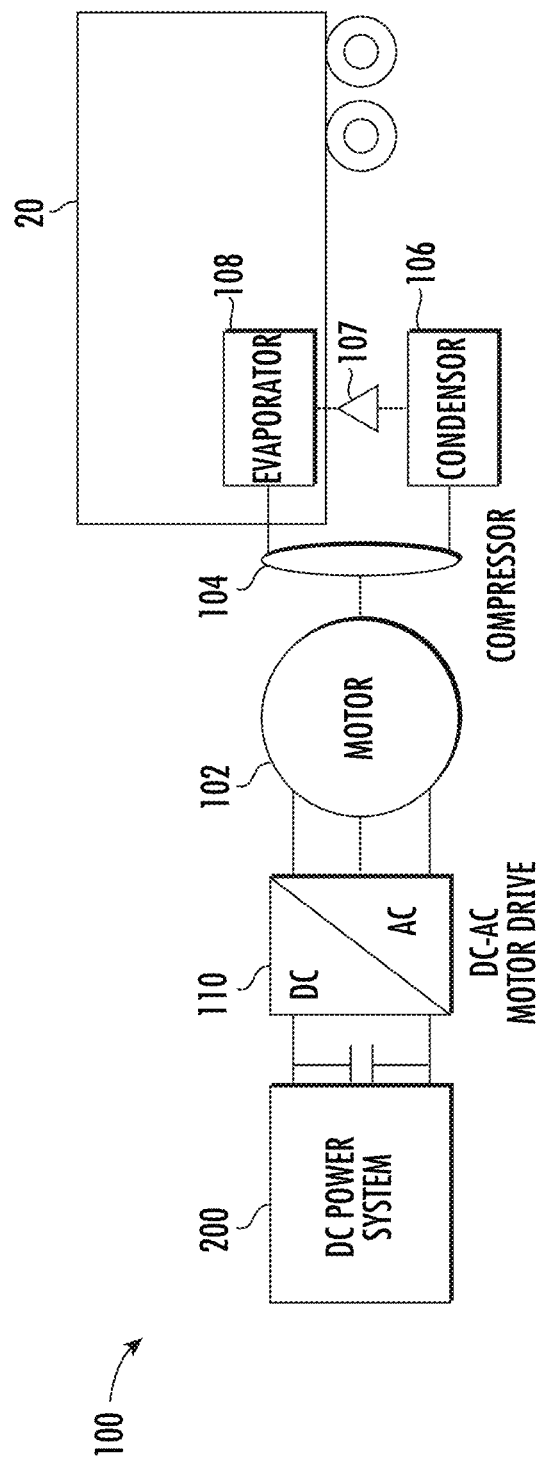
FIG. 1 is a block diagram of a transport refrigeration system in an example embodiment.

FIG. 1 is a block diagram of transport refrigeration system 100 in an example embodiment. The transport refrigeration system 100 may be configured to condition air in a cargo space 20, which may include a refrigerated container, a refrigerated trailer, etc.

The transport refrigeration system 100 includes a variable speed motor 102 that is coupled to a compressor 104. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled application). The liquid refrigerant exiting condenser 106 is delivered to an evaporator 108 through an expansion valve 107. The refrigerant passes through the expansion valve 107 where a pressure drop causes the high-pressure liquid refrigerant to achieve a lower pressure combination of liquid and vapor. As fluid passes the evaporator 108, the low-pressure liquid refrigerant evaporates, absorbing heat from the fluid, thereby cooling the fluid and evaporating the refrigerant. The low-pressure refrigerant is again delivered to compressor 104 where it is compressed to a high-pressure, high temperature gas, and delivered to condenser 106 to start the refrigeration cycle again. It is to be appreciated that while a specific transport refrigeration system is shown in FIG. 1, the present teachings are applicable to any transport refrigeration system.

As shown in FIG. 1, the compressor 104 driven by a variable speed motor 102 from power supplied from a direct current (DC) power system 200 and a DC-alternating current (AC) inverter 110. The inverter 110 includes solid-state electronics to produce multiphase, AC output voltage. In an embodiment, inverter 110 converts the DC voltage from the DC power system 200 into a multiphase, AC output voltage, at a desired frequency and/or magnitude in order to drive the multiphase motor 102. Such inverters 110 are known in the art.

Figure 2:
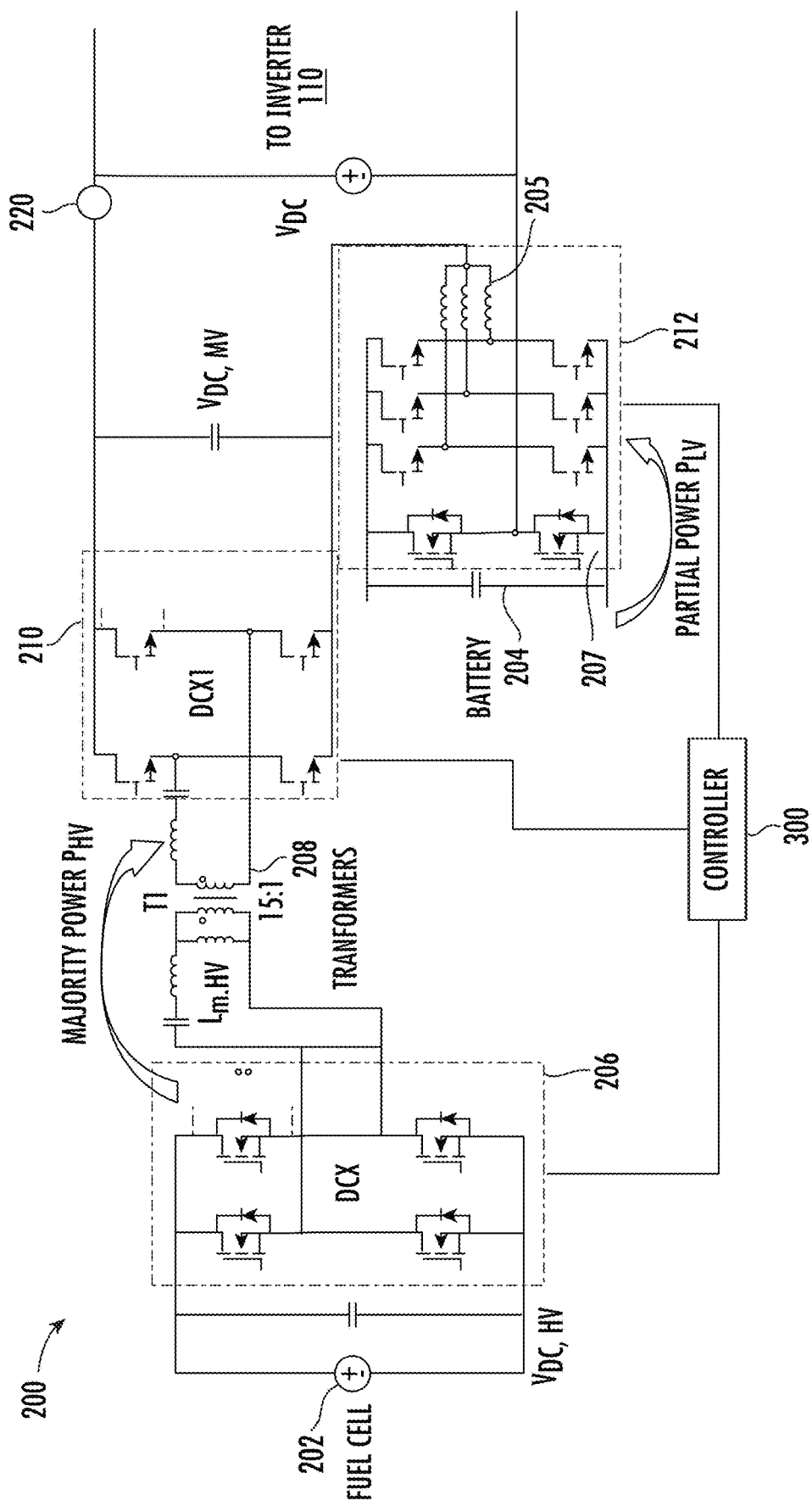
FIG. 2 is a schematic diagram of a DC power system in an example embodiment.

FIG. 2 is a schematic diagram of a DC power system 200 in an example embodiment. The DC power system 200 may be referred to as a hybrid power system as it includes two types of power sources. A primary power source 202 provides a majority of the power for the transport refrigeration system 100. In the example embodiment of FIG. 2, the primary power source 202 incudes a fuel cell. In other embodiments, the primary power source 202 includes a battery. A secondary power source 204 augments the primary power source 202 when needed. In the example embodiment of FIG. 2, the secondary power source 204 includes a battery.

The output of the primary power source 202 may be a relatively low voltage, for example, 48 volts DC. The transport refrigeration system 100 may require a higher voltage, for example, 750 volts DC. The output of the primary power source 202 is connected to a DC-AC converter 206. The DC-AC converter 206 uses switches (e.g., silicon carbide (SiC) metal-oxide-semiconductor field-effect transistors (MOSFETs)) to produce an AC output. A controller 300 controls the switches in the DC-AC converter 206. The controller 300 may be implemented using a general-purpose microprocessor executing a computer program stored on a storage medium to perform the operations described herein. Alternatively, controller 300 may be implemented in hardware (e.g., application-specific integrated circuit (ASIC), field-programmable gate array (FPGA)) or in a combination of hardware/software.

The output of the DC-AC converter 206 is supplied to a transformer 208. The transformer 208 may be a high frequency, LLC transformer. The transformer 208 increases the AC output of the DC-AC converter 206 by a step up value (e.g., 15×). The stepped-up output of the transformer 208 is provided to an AC-DC converter 210. The AC-DC converter 210 uses switches (e.g., gallium nitride (GaN) MOSFETs) to produce a primary DC voltage. The controller 300 controls the switches in the AC-DC converter 210. The DC-AC converter 206, transformer 208 and AC-DC converter 210 provide an inductance, capacitance (LLC) converter (or dual active bridge) using a zero voltage switching (ZVS) mode to minimize switching losses, which results in increased efficiency, a smaller cooling system and overall smaller system.

The secondary power source 204 is connected to the output of the AC-DC converter 210 though a DC-DC converter 212. The DC-DC converter 212 may be, for example, a buck converter. The DC-DC converter 212 uses switches (e.g., GaN MOSFETs) to produce a secondary DC voltage. The controller 300 controls the switches in the DC-DC converter 212. The secondary power source 204 and the DC-DC converter 212 are connected in electrical series with the output of AC-DC converter 210. The secondary power source 204 implements hard switching at the cost of higher switching losses to fine tune the secondary DC voltage and provide higher precision at the output voltage level. However, the voltage handled by the DC-DC converter 212 is low voltage (hence reducing switching losses) and GaN devices may be used for lower switching losses.

The secondary power source 204 may utilize GaN switches to switch at higher frequency and interleaving branches of three inductors 205 to minimize inductor size, which provides higher power density. The DC-DC converter 212 utilizes the auxiliary leg 207 (two switches in series between the positive terminal of batter 204 and the negative terminal of battery 204) to change the polarity of the secondary DC voltage to be additive or subtractive to the primary DC voltage.

In operation, the controller 300 monitors the primary DC voltage output by AC-DC converter 210 through a sensor 220. If the primary DC voltage is less than a reference (e.g., 750 volts DC), the controller 300 controls the DC-DC converter 212 to supply a positive secondary DC voltage, which is combined with the primary DC voltage. The controller 30 modifies a switching pattern of the DC-DC converter 212 to achieve the necessary remaining voltage needed for the final total Vdc output voltage of the DC/DC converter 200. If needed (due to high load demand by the refrigeration unit), the controller may command the DC-DC converter 212 to change the polarity of the secondary DC voltage (through auxiliary leg 207) to reduce extreme points in the primary DC voltage.

If the primary DC voltage is greater than the reference, the controller 300 controls the DC-DC converter 212 to supply a negative secondary DC voltage (through auxiliary leg 207), which is combined with the primary DC voltage. The combination of the primary DC voltage and the secondary DC voltage is the output of the DC power system 200. In this way, the secondary power source 204 accounts for transients in the primary DC voltage to provide a stable DC output from the DC power system 200.

During time periods where there is low or no demand for power from the DC power system 200, the primary power source 202 (e.g., a battery or fuel cell) may be used to charge the secondary power source 204 (e.g., battery, capacitor, etc.). The controller 300 operates the AC-DC converter 206 and AC-DC converter 210 to favor charging the battery 204 when the DC output voltage demand by the refrigeration system is relaxed, such as maintaining temperature as opposed to a "pull down" condition where the power requirement is high.

Figure 3:
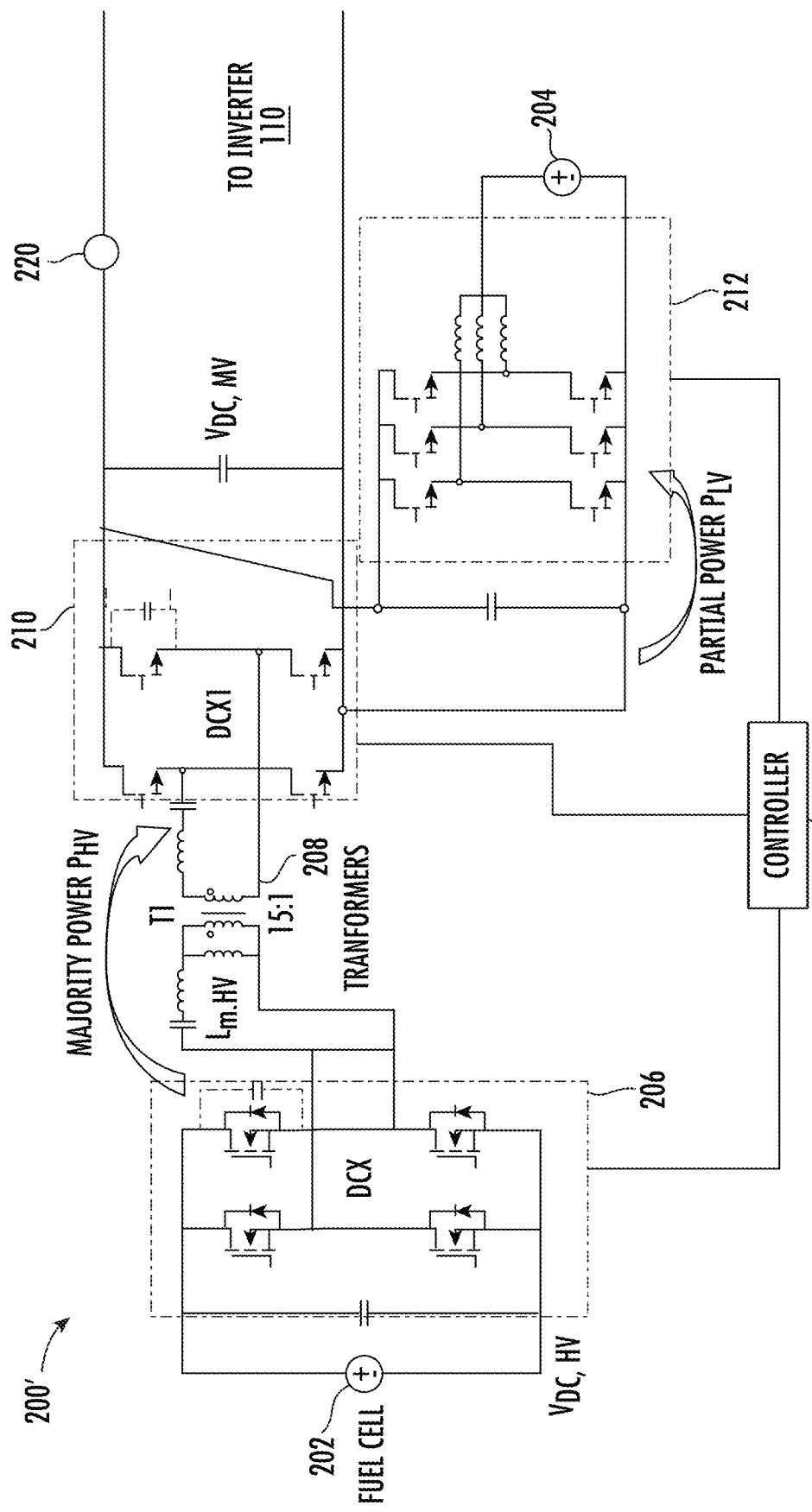
FIG. 3 is a schematic diagram of a DC power system in an example embodiment.

FIG. 3 is a schematic diagram of a DC power system 200' in an example embodiment. The elements of FIG. 3 are similar to those in FIG. 2. The notable difference in FIG. 3, is that the secondary power source 204 and the DC-DC converter 212 are connected in electrical parallel with the output of AC-DC converter 210. The DC power system 200' operates in a similar manner as DC power system 200 of FIG. 2, in that the secondary power source 204 is used to increase or decrease the primary DC voltage output by AC-DC converter 210.

Embodiments of this disclosure enable cost optimization of a transport refrigeration system by allowing a secondary power source 204 to account for transients in a primary power source 202. The DC-AC converter 206, transformer 208 and AC-DC converter 210 are designed to reduce losses and ensure efficiency. The secondary power source 204 and DC-DC converter 212 may be less efficient, but ensure that the DC power system satisfies the voltage requirement for the inverter 110.

The DC-AC converter 206, AC-DC converter 210 and DC-DC converter 212 may use different types of switches. For example, the DC-AC converter 206 may use SiC switches for handling high voltage and ZVS (soft switching). The AC-DC converter 210 may use GaN switches and the DC-DC converter 212 may use SiC switches.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a compressor, condenser and evaporator;
an inverter providing a multiphase, AC output voltage to the compressor; and
a DC power system having an output coupled to the inverter, the DC power system including:
a primary DC power source;
a DC-AC converter connected to receive an output of the primary DC power source;
a transformer connected to receive an output of the DC-AC converter;
an AC-DC converter connected to receive an output of the transformer, the AC-DC converter outputting a primary DC voltage;
a secondary DC power source; and
a DC-DC converter connected to receive an output of the secondary DC power source, the DC-DC converter outputting a secondary DC voltage;
wherein a combination of the primary DC voltage and the secondary DC voltage provides the output of the DC power system to the inverter;
a controller coupled to the DC-DC converter, wherein the controller is configured to compare the primary DC voltage to a reference;
wherein the controller is configured to control the DC-DC converter to supply a positive secondary DC voltage when the primary DC voltage is less than the reference; and
wherein the controller is configured to control the DC-DC converter to supply a negative secondary DC voltage when the primary DC voltage is greater than the reference.

2. The transport refrigeration system of claim 1, wherein the primary DC power source includes a fuel cell.

3. The transport refrigeration system of claim 1, wherein the primary DC power source includes a battery.

4. The transport refrigeration system of claim 1, wherein the secondary DC power source includes a battery.

5. The transport refrigeration system of claim 1, wherein the DC-DC converter is connected in electrical series with the AC-DC converter.

6. The transport refrigeration system of claim 1, wherein the DC-DC converter is connected in electrical parallel with the AC-DC converter.

7. The transport refrigeration system of claim 1, further comprising a sensor in communication with the controller, the sensor configured to detect the primary DC voltage.

8. The transport refrigeration system of claim 1, wherein the DC-AC converter includes SiC switches, the AC-DC converter includes GaN switches, and the DC-DC converter includes GaN switches.

9. The transport refrigeration system of claim 1, wherein the DC-AC converter includes SiC switches, the AC-DC converter includes GaN switches, and the DC-DC converter includes SiC switches.

10. The transport refrigeration system of claim 1, wherein the transformer is a high switching frequency transformer with zero voltage switching.

\* \* \* \* \*